US011652853B2

(12) United States Patent
Jung et al.

(10) Patent No.: US 11,652,853 B2
(45) Date of Patent: May 16, 2023

(54) INTEGRATED CORE NETWORK OF 5G AND ATSC 3.0, CONTROL PLANE ENTITY AND METHOD FOR TRANSMITTING MULTIMEDIA CONTENT IN CONTROL PLANE ENTITY

(71) Applicant: ELECTRONICS AND TELECOMMUNICATIONS RESEARCH INSTITUTE, Daejeon (KR)

(72) Inventors: Hoi-Yoon Jung, Sejong-si (KR); Sung-Ik Park, Daejeon (KR); Heung-Mook Kim, Daejeon (KR); Nam-Ho Hur, Sejong-si (KR); David Gomez-Barquero, Cartagena (ES); Eduardo Garro, Alboraya (ES); Carlos Barjau Estevan, Valencia (ES)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/314,276

(22) Filed: May 7, 2021

(65) Prior Publication Data

US 2021/0377318 A1 Dec. 2, 2021

(30) Foreign Application Priority Data

Jun. 1, 2020 (KR) ........................ 10-2020-0066087

(51) Int. Cl.
*H04L 65/1023* (2022.01)
*H04L 65/1069* (2022.01)
(Continued)

(52) U.S. Cl.
CPC ...... *H04L 65/1023* (2013.01); *H04L 65/1069* (2013.01); *H04L 65/80* (2013.01); *H04W 28/0819* (2020.05)

(58) Field of Classification Search
CPC . H04L 65/1023; H04L 65/1069; H04L 65/80; H04L 65/103; H04L 65/1095; H04W 28/0819
See application file for complete search history.

(56) References Cited

U.S. PATENT DOCUMENTS

2009/0128708 A1* 5/2009 Huffman ............ H04N 21/4424
348/705
2017/0085494 A1 3/2017 Park et al.
(Continued)

FOREIGN PATENT DOCUMENTS

CN 201369798 Y * 12/2009
KR 10-2017-0034314 A 3/2017
(Continued)

OTHER PUBLICATIONS

3GPP TR 23.793, Study on access traffic steering, switch and splitting support in the 5G system architecture (Release 16), 2018 (Year: 2018).*
(Continued)

*Primary Examiner* — Zhensheng Zhang
(74) *Attorney, Agent, or Firm* — Rabin & Berdo, P.C.

(57) ABSTRACT

Disclosed herein is an integrated core network of 5G and ATSC 3.0. The integrated core network of 5G and ATSC 3.0 includes multiple control plane entities and a user plane entity, and further includes an ATSC 3.0 gateway, thereby enabling multimedia content transmitted from the ATSC 3.0 gateway to the user plane entity under the control of the control entity to be delivered to user equipment over an ATSC 3.0 terrestrial network. The ATSC 3.0 gateway may include an ATSC 3.0 Control Plane Gateway (CP-GW) connected between the user plane entity and the multiple control plane entities and an ATSC 3.0 User Plane Gateway (UP-GW) connected to the user plane entity.

15 Claims, 6 Drawing Sheets (51) Int. Cl.
 *H04W 28/08* (2023.01)
 *H04L 65/80* (2022.01)

(56) References Cited

U.S. PATENT DOCUMENTS

2017/0295409 A1   10/2017   Simon et al.
2019/0373505 A1   12/2019   Jun et al.

FOREIGN PATENT DOCUMENTS

KR    10-2019-0021812 A    3/2019
KR    10-2019-0136948 A    12/2019
WO       2017/177010 A1    10/2017

OTHER PUBLICATIONS

Michael Simon et al., "ATSC 3.0 Broadcast 5G Unicast Heterogeneous Network Converged Services Starting Release 16", IEEE Transactions on Broadcasting, Apr. 23, 2020.

* cited by examiner

INTEGRATED CORE NETWORK OF 5G AND ATSC 3.0, CONTROL PLANE ENTITY AND METHOD FOR TRANSMITTING MULTIMEDIA CONTENT IN CONTROL PLANE ENTITY

CROSS REFERENCE TO RELATED APPLICATION

This application claims the benefit of Korean Patent Application No. 10-2020-0066087, filed Jun. 1, 2020, which is hereby incorporated by reference in its entirety into this application.

BACKGROUND OF THE INVENTION

1. Technical Field

The disclosed embodiment relates generally to a mobile communication system, and more particularly to technology for transmitting multimedia content in a mobile communication system.

2. Description of the Related Art

Mobile video traffic accounts for more than half of all mobile traffic in the world. It accounted for 59% of mobile traffic in 2017, and is expected to increase to 79% by 2022.

Mobile Network Operators (MNO) are not able to simultaneously transmit the same multimedia content to multiple users because the infrastructure was designed for point-to-point (P2P) data transmission. Accordingly, in order to enable mobile broadband networks to satisfy the demand of mass media, cooperation between heterogeneous access networks is required.

To this end, ATSC 3.0 broadcast downlink access may be proposed, and this has no limit on the number of users who consume the same content in real time. Also, broadcast access may function as a supplementary service network capable of supporting mobile broadband networks by efficiently delivering content, such as public warning messages or massive Internet-of-Things (IoT) software updates, which are simultaneously used by multiple users.

Meanwhile, according to the 3rd-Generation Partnership Project (3GPP), the latest cellular generation is 5G. All of the improvements added since June, 2018 are regarded as part of 5G, and updates of previous technology, such as LTE, are also included therein.

4G includes enhanced Multicast/Broadcast Multimedia Services (eMBMS) in order to provide broadcast communication, whereas 5G does not incorporate a Point-to-Multipoint (P2M) solution therein, although P2M is a scalable and cost-efficient solution capable of providing high-quality multimedia content to multiple users.

SUMMARY OF THE INVENTION

An object of an embodiment is to enable scalable and cost-efficient Point-to-Multipoint (P2M) transmission, through which high-quality multimedia content can be provided to a large number of users, in 5G.

A method for controlling transmission of multimedia content in a control plane entity according to an embodiment includes determining whether to perform Access Traffic Steering, Switching and Splitting (ATSSS) based on whether the multimedia content is suitable for transmission over an ATSC 3.0 terrestrial network; performing control so as to initialize an ATSC 3.0 session with an ATSC 3.0 Control Plane Gateway (CP-GW) and to activate an ATSC 3.0 User Plane Gateway (UP-GW) when it is determined to perform the ATSSS; and activating a control plane for transmitting and receiving control signals over the ATSC 3.0 terrestrial network and a user plane for transmitting and receiving data over the ATSC 3.0 terrestrial network. The multimedia content transmitted from the ATSC 3.0 UP-GW to a user plane entity may be delivered to user equipment over the ATSC 3.0 terrestrial network.

Here, determining whether to perform the ATSSS may be configured to determine to perform steering from a 5G access network to the ATSC 3.0 terrestrial network in response to a request for the multimedia content from user equipment registered in the 5G access network.

Here, determining whether to perform the ATSSS may be configured to determine to switch from a 5G access network to the ATSC 3.0 terrestrial network based on the number of accesses to the 5G access network for the multimedia content, the method may further include transmitting a switching request message for requesting access switching from the 5G access network to the ATSC 3.0 terrestrial network to the user equipment after activating the control plane and the user plane, and the user plane entity may transmit the multimedia content, transmitted from the ATSC 3.0 UP-GW, over the ATSC 3.0 terrestrial network.

Here, determining whether to perform the ATSSS may be configured to determine to split from a 5G access network to the ATSC 3.0 terrestrial network based on the number of accesses to the 5G access network for the multimedia content, the method may further include transmitting a dual access request message for requesting dual access to the 5G access network and the ATSC 3.0 terrestrial network to the user equipment after activating the control plane and the user plane, and the user plane entity may transmit the multimedia content, transmitted from the ATSC 3.0 UP-GW, over the 5G access network and the ATSC 3.0 terrestrial network.

According to an embodiment, the method may further include sending, by the ATSC 3.0 UP-GW, an activation response to the ATSC 3.0 CP-GW, and sending, by the ATSC 3.0 CP-GW, an activation response to the control plane entity.

Here, the ATSC 3.0 CP-GW may generate timing/management information (timing & management information) for managing a preamble of an ATSC 3.0 frame and a Single-Frequency Network (SFN).

Here, the ATSC 3.0 CP-GW may communicate with the control plane entity through an N_ATSC_C interface, and may communicate with the user plane entity through an N_ATSC_U interface.

Here, the ATSC 3.0 UP-GW may perform data forwarding and ALP/STL formatting.

A control plane entity according to an embodiment includes memory in which at least one program is recorded and a processor for executing the program. The program may perform determining whether to perform Access Traffic Steering, Switching and Splitting (ATSSS) based on whether multimedia content is suitable for transmission over an ATSC 3.0 terrestrial network; performing control so as to initialize an ATSC 3.0 session with an ATSC 3.0 Control Plane Gateway (CP-GW) and to activate an ATSC 3.0 User Plane Gateway (UP-GW) when it is determined to perform the ATSSS; and activating a control plane for transmitting and receiving control signals over the ATSC 3.0 terrestrial network and a user plane for transmitting and receiving data over the ATSC 3.0 terrestrial network. The multimedia content transmitted from the ATSC 3.0 UP-GW to a user plane entity may be delivered to user equipment over the ATSC 3.0 terrestrial network.

Here, determining whether to perform the ATSSS may be configured to determine to perform steering from a 5G access network to the ATSC 3.0 terrestrial network in response to a request for the multimedia content from user equipment registered in the 5G access network.

Here, determining whether to perform the ATSSS may be configured to determine to switch from a 5G access network to the ATSC 3.0 terrestrial network based on the number of accesses to the 5G access network for the multimedia content, the program may further perform transmitting a switching request message for requesting access switching from the 5G access network to the ATSC 3.0 terrestrial network to the user equipment after activating the control plane and the user plane, and the user plane entity may transmit the multimedia content, transmitted from the ATSC 3.0 UP-GW, over the ATSC 3.0 terrestrial network.

Here, determining whether to perform the ATSSS may be configured to determine to split from a 5G access network to the ATSC 3.0 terrestrial network based on the number of accesses to the 5G access network for the multimedia content, the program may further perform transmitting a dual access request message for requesting dual access to the 5G access network and the ATSC 3.0 terrestrial network to the user equipment after activating the control plane and the user plane, and the user plane entity may transmit the multimedia content, transmitted from the ATSC 3.0 UP-GW, over the 5G access network and the ATSC 3.0 terrestrial network.

Here, the ATSC 3.0 CP-GW may generate timing/management information (timing & management information) for managing a preamble of an ATSC 3.0 frame and a Single-Frequency Network (SFN).

Here, the ATSC 3.0 CP-GW may communicate with the control plane entity through an N_ATSC_C interface, and may communicate with the user plane entity through an N_ATSC_U interface.

Here, the ATSC 3.0 UP-GW may perform data forwarding and ALP/STL formatting.

An embodiment is an integrated core network of 5G and ATSC 3.0 including multiple control plane entities and a user plane entity, and an ATSC 3.0 gateway is further included therein in order to deliver multimedia content, transmitted from the ATSC 3.0 gateway to the user plane entity under the control of the control plane entity, to user equipment over an ATSC 3.0 terrestrial network. The ATSC 3.0 gateway may include an ATSC 3.0 Control Plane Gateway (CP-GW) connected between the user plane entity and the multiple control plane entities; and an ATSC 3.0 User Plane Gateway (UP-GW) connected to the user plane entity.

Here, the ATSC 3.0 CP-GW may generate timing/management information (timing & management information) for managing a preamble of an ATSC 3.0 frame and a Single-Frequency Network (SFN).

Here, the ATSC 3.0 CP-GW may communicate with the control plane entity through an N_ATSC_C interface of a RESTful paradigm.

Here, the ATSC 3.0 CP-GW may communicate with the user plane entity through an N_ATSC_U interface.

Here, the ATSC 3.0 UP-GW may perform data forwarding and ALP/STL formatting.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an integrated core network of 5G and ATSC 3.0, a control plane entity and a method for controlling transmission of multimedia content in the control plane entity according to an embodiment will be described in detail with reference to FIGS. 1 to 7.

When compared with a 4G core network configured with individual monolithic entities, the biggest change in a 5G core network is adoption of Service-Based Architecture (SBA). Here, the entity forming the core is a network function that exposes functions using a Representational State Transfer API (RESTful API).

Basically, all of interaction and interconnection between entities in a 5G core network are based on HTTP requests (GET, PUT, POST and DELETE). The reason for standardizing a network function (NF) in this way is to allow Network Function Virtualization (VFV). Virtualization exposes functions and interaction through HTTP requests, thereby abstracting components or network functions (NF) in basic hardware or a system.

Another important function of 5G is the use of Software-Defined Networking (SDN). SDN provides a standardized interface between a network node for delivering user data in a core and a controller in Service-Based Architecture (SBA).

Mobile Network Operators (MNO) may actively monitor traffic and offload data to a redundant link or reroute the same to a desired path by complying with 5G core Software-Defined Networking (SDN). SDN technology encompasses various functions from packet header checking to payload checking in order to apply routing rules. SDN is the basis of Control and User Plane Separation (CPUS).

Also, 5G is configured as a system including support for multiple heterogeneous access techniques in the same framework. That is, a 5G core is able to support a non-5G access network, and is aimed at Wi-Fi and a wired connection at the outset, but the specifications thereof are open to other wireless techniques. This is extended in the Rel-16 version of the 5G core as trusted non-3GPP access.

Trusted non-3GPP access occurs when devices are able to subscribe to data from a mobile network via non-3GPP radio access and authenticate and send/receive the same.

The motive for standardization of this operation mode in 3GPP is to cause Wi-Fi access in a residential network to be included in a mobile core network as a complement to LTE or NR, which reuses all existing procedures, such as session management, data encryption, and the like, to thereby enable a single core to manage all of broadband and fixed Internet connectivity.

Trusted access convergence has advantages in that non-3GPP access and 3GPP access, operable by a single core network, can be individually configured and in that policies for the respective transmission techniques operated in different spectrums can be applied.

Accordingly, the present invention integrates non-3GPP ATSC 3.0, which is a broadcast standard, into 5G architecture of a 3GPP cellular standard using the concept of trusted access convergence, thereby enabling Point-to-Multipoint (P2M) transmission of multimedia content.

Figure 1:
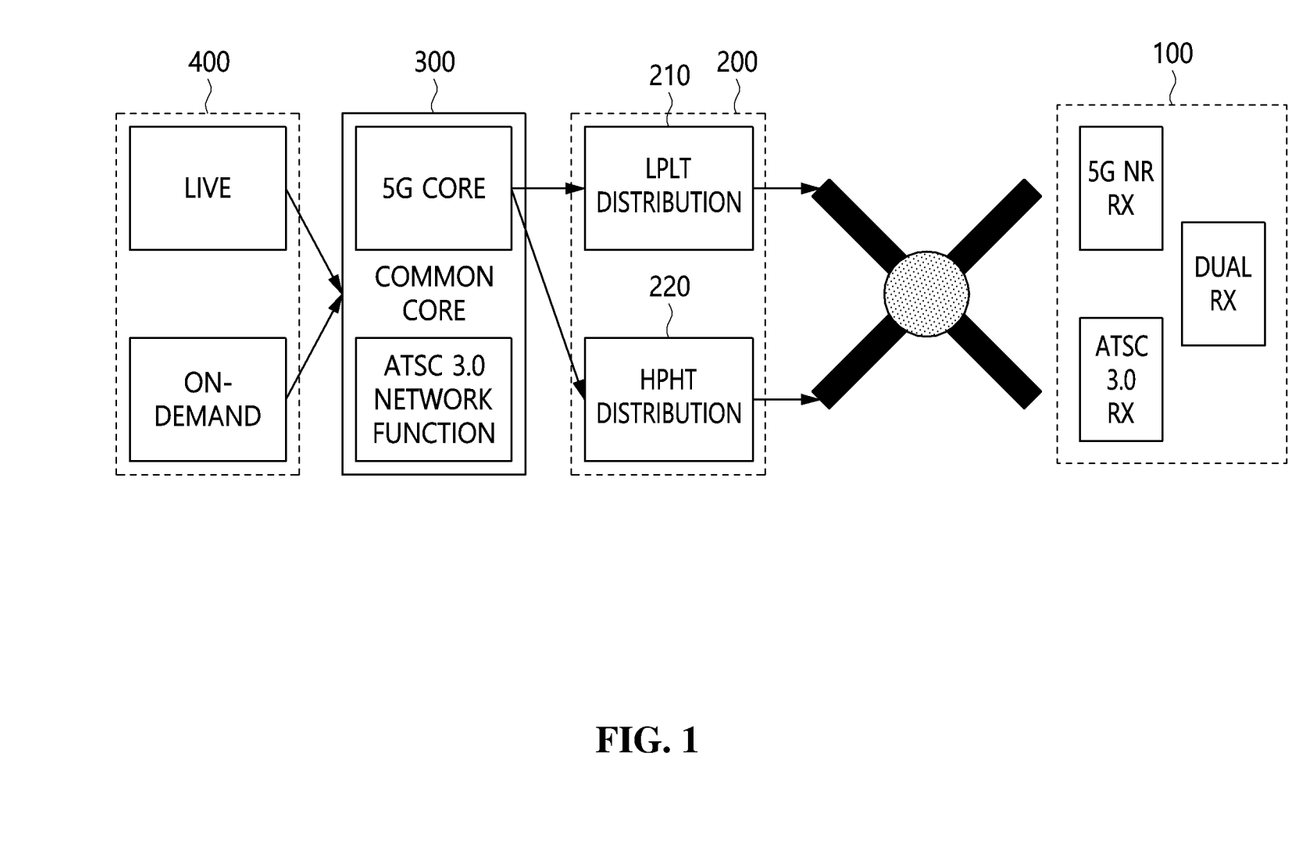
FIG. 1 is a concept diagram for explaining integration of functional entities of ATSC 3.0, which is a broadcast standard, into 5G architecture of a 3GPP cellular standard according to an embodiment.

FIG. 1 is a concept diagram for explaining the integration of functional entities of ATSC 3.0, which is a broadcast standard, into 5G architecture of a 3GPP cellular standard according to an embodiment.

Referring to FIG. 1, ATSC 3.0 gateway functionalities may reside in a 5G core 300 as software network functions using Service-Based Architecture (SBA) of 5G in an embodiment.

A single core network 300 may enable multimedia content, delivered from a Data Network (DN) 400, to be transmitted over at least one of 5G radio access networks 210, which are Low-Power Low-Tower (LPLT) infrastructure, and ATSC 3.0 terrestrial networks 220, which are High-Power High-Tower (HPHT) infrastructure.

Here, the 5G radio access network 210 is advantageous in Point-to-Point (P2P) transmission because it is formed of Low-Power Low-Tower (LPLT) infrastructure.

Conversely, the ATSC 3.0 terrestrial network 220 is advantageous in Point-to-Multipoint (P2M) transmission because it is formed of High-Power High-Tower (HPHT) infrastructure.

Therefore, the core network 300 may enable data that is suitable for being transmitted through Point-to-Multipoint (P2M) transmission, that is, multimedia content, transmission of which is simultaneously requested by multiple user terminals 100, to be transmitted over the ATSC 3.0 terrestrial network 220.

Here, the user terminal 100 may receive the multimedia content by accessing at least one of the 5G access network 210 and the ATSC 3.0 terrestrial network 220. To this end, the user terminal 100 needs an embedded chipset capable of supporting both ATSC 3.0 and 5G transmission.

Figure 2:
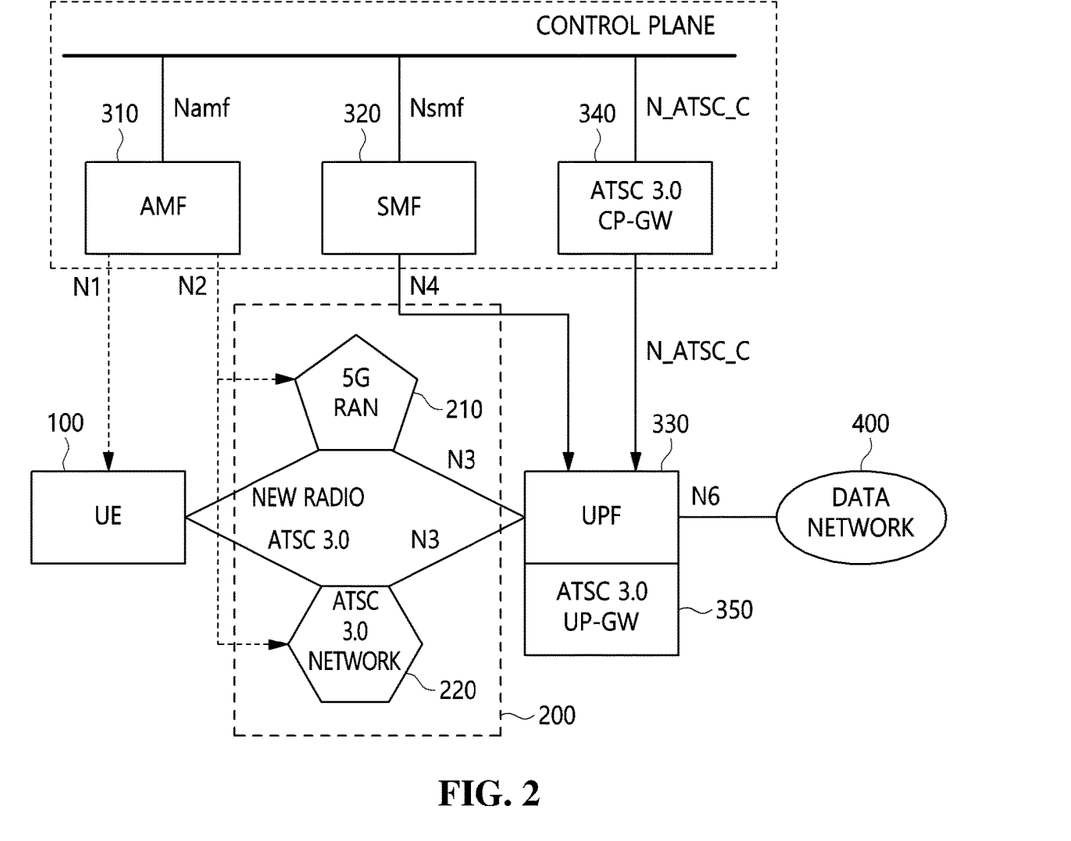
FIG. 2 is a block diagram illustrating a core network in which 5G and ATSC 3.0 are integrated according to an embodiment in detail.

FIG. 2 is a block diagram illustrating in detail a core network in which 5G and ATSC 3.0 are integrated according to an embodiment.

Referring to FIG. 2, the core network 300 in which 5G and ATSC 3.0 are integrated may include an Access and Mobility Management Function (AMF) 310, a Session Management Function (SMF) 320, and a User Plane Function (UPF) 330 as the components of a 5G standard network core.

The AMF 310 and the SMF 320 are network entities of a control plane.

The AMF 310 performs authentication, access, and mobility control functions of User Equipment (UE) 100 through N1, which is a Non-Access Stratum (NAS) signal interface. According to an embodiment, the AMF 310 may make the UE 100 prepare for access to an access network 200, which performs Access Traffic Steering, Switching and Splitting (ATSSS).

Also, the AMF 310 may transmit a routing rule for the UE 100 to the access networks 210 and 220.

The SMF 320 has session control functions (setting/changing/releasing a session) through an N4 interface with the UPF 330, and performs signaling procedures for setting a traffic path and managing traffic transfer. That is, the SMF 320 controls the data path between the UPF 330 and the access networks 210 and 220.

The UPF 330 is a network entity of a user plane that accommodates the multiple-access networks 210 and 220 in an integrated manner through an N3 interface.

The UPF 330 connects a data plane between the multiple-access networks 210 and 220 and a Data Network (DN) 400, whereby multimedia content may be transmitted to the UE 100.

The UPF 330 receives a control rule for traffic between the UE 100 and the UPF 330 from the SMF 320 through the N4 interface and performs functions such as traffic detection, routing, QoS control, and the like based on the received control rule.

As described above, the 5G core network is characterized by separation of a control plane and a user plane. Accordingly, the ATSC 3.0 network function according to an embodiment is also separated into a control plane and a user plane.

That is, the integrated core network 300 of 5G and ATSC 3.0 further includes an ATSC 3.0 gateway, and may enable multimedia content, transmitted from the ATSC 3.0 gateway to a user plane entity under the control of a control plane entity, to be delivered to the user equipment over the ATSC 3.0 terrestrial network.

Here, the ATSC 3.0 gateway may be separated into two logic blocks, which are an ATSC 3.0 Control Plane Gateway (CP-GW) 340 and an ATSC 3.0 User Plane Gateway (UP-GW).

Here, the ATSC 3.0 CP-GW 340 may connect the plurality of control plane entities 310 and 320 to the user plane entity 330, and may generate timing/management information (timing & management information) for managing the preamble of an ATSC 3.0 frame and a Single-Frequency Network (SFN).

That is, other entities, such as the SMF or AMF, may request specific broadcast data from the CP-GW using an API call for CP-GW information. Here, a broadcast transmission state, a geographical area, the amount of wireless resources that are used, and the like may be included in the broadcast data.

Here, the ATSC 3.0 UP-GW 350 may collect multimedia data from the data network 400, and may forward the same to the user plane entity 330 (data forwarding) or perform ALP/STL formatting.

Also, in order to include ATSC 3.0 functions in a 5G core, two new interfaces, namely N_ATSC_C and N_ATSC_U, are proposed.

Here, N_ATSC_C follows a RESTful paradigm using SBA distribution and exposes the services and state of the ATSC 3.0 CP-GW to the 5G core network.

Here, N_ATSC_U is an interface between points at which a preamble, timing and signaling are provided in order to form an ATSC 3.0 frame and manage a Single-Frequency Network (SFN).

Meanwhile, the 5G core integrates an ATSSS function as a part of Rel-16. The ATSSS may provide a 5G connection using Non-New-Radio air technology.

Here, ATSSS refers to a service for steering, switching, and splitting an access network related to traffic destined for another access network.

Traffic steering is performed to select the optimal access network for transmitting user data. Traffic switching enables handover between access techniques. Traffic splitting splits IP user packets across 5G and non-5G so as to be simultaneously transmitted in order to improve the processing rate and stability.

Therefore, according to an embodiment, the core network 200 may select traffic, decide to change the access network from the 5G access network 210 to the ATSC 3.0 terrestrial network, and perform ATSSS. Here, the ATSC 3.0 terrestrial network 220 may be used as secondary access points in the state in which the 5G access network 210 is preferentially accessed.

Hereinafter, a method for controlling transmission of multimedia content in a control plane entity according to an embodiment will be described.

The method for controlling transmission of multimedia content in a control plane entity according to an embodiment includes determining whether to perform Access Traffic Steering, Switching and Splitting (ATSSS) based on whether multimedia content is suitable for transmission over an ATSC 3.0 terrestrial network, performing control so as to initialize an ATSC 3.0 session with an ATSC 3.0 Control Plane Gateway (CP-GW) and to activate an ATSC 3.0 User Plane Gateway (UP-GW) when it is determined to perform ATSSS, and activating a control plane for transmitting and receiving control signals over the ATSC 3.0 terrestrial network and a user plane for transmitting and receiving data over the ATSC 3.0 terrestrial network. Here, the multimedia content transmitted from the ATSC 3.0 UP-GW to the user plane entity may be delivered to user equipment over the ATSC 3.0 terrestrial network.

The method for controlling transmission of multimedia content in a control plane entity according to the present invention will be described through embodiments of steering, switching and splitting with reference to FIGS. 3 to 5.

Figure 3:
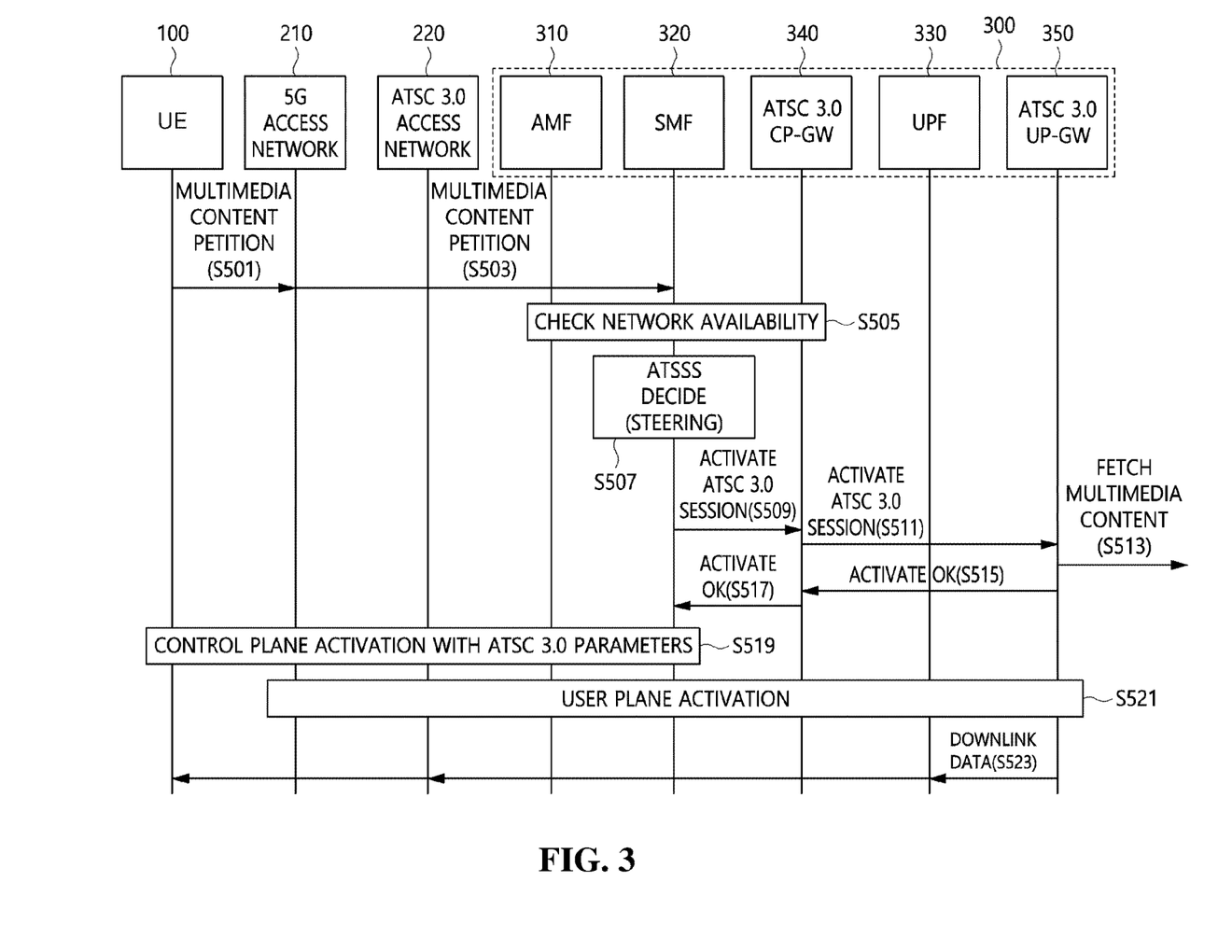
FIG. 3 is a signal flow diagram for explaining an ATSSS steering process according to an embodiment.

FIG. 3 is a signal flow diagram for explaining an ATSSS steering process according to an embodiment.

Referring to FIG. 3, in response to a request for multimedia content from user equipment registered in a 5G access network, it may be determined to perform steering from the 5G access network to an ATSC 3.0 terrestrial network at steps S501 to S507.

That is, when a multimedia content petition from the UE 100 is delivered to an SMF 320 at steps S501 to S503, the SMF 320 checks whether the requested multimedia content is suitable for transmission over the ATSC 3.0 terrestrial network at step S505.

Depending on the result of network suitability checking at step S505, the SMF 320 determines whether to perform ATSSS steering at step S507.

When it is determined to perform ATSSS steering at step S507, the SMF 320 tells an ATSC 3.0 CP-GW 340 to start an ATSC 3.0 session with the multimedia content at step S509, and the ATSC 3.0 CP-GW 340 activates an ATSC 3.0 UP-GW 350 at step S511.

Accordingly, the activated ATSC 3.0 UP-GW 350 starts to fetch the requested multimedia content at step S513. Here, the ATSC 3.0 UP-GW 350 may transmit an activation response signal (Activate OK) to the SMF 320 via the ATSC 3.0 CP-GW 340 at steps S515 to S517.

Then, a control plane for transmitting and receiving control signals over the ATSC 3.0 terrestrial network 220 is activated at step S519. Also, a user plane for transmitting and receiving data over the ATSC 3.0 terrestrial network 220 is activated at step S521. That is, a radio access section is set in the UE 100 and the ATSC 3.0 terrestrial network 220, and an N3 tunnel between the ATSC 3.0 terrestrial network 220 and a UPF 330 is set. Here, Access Network (AN) tunnel information, Core Network (CN) tunnel information, a permitted Quality of service Flow Identifier (QFI), and Quality of Service (QoS) flow list information are exchanged between the ATSC 3.0 terrestrial network 220 and the UPF 330. The method of activating the control plane and the user plane is known to those having ordinary knowledge in the technical field to which the present invention pertains, and thus a detailed description thereof will be omitted.

Then, the multimedia content transmitted from the ATSC 3.0 UP-GW 350 to the user plane entity 330 may be delivered to the UE 100 over the ATSC 3.0 terrestrial network 220 at step S523.

Here, the ATSC 3.0 CP-GW 340 may generate timing/management information (timing & management information) for managing the preamble of an ATC 3.0 frame and a Single-Frequency Network (SFN).

Here, the ATSC 3.0 UP-GW 350 may perform data forwarding and ALP/STL formatting.

Figure 4:
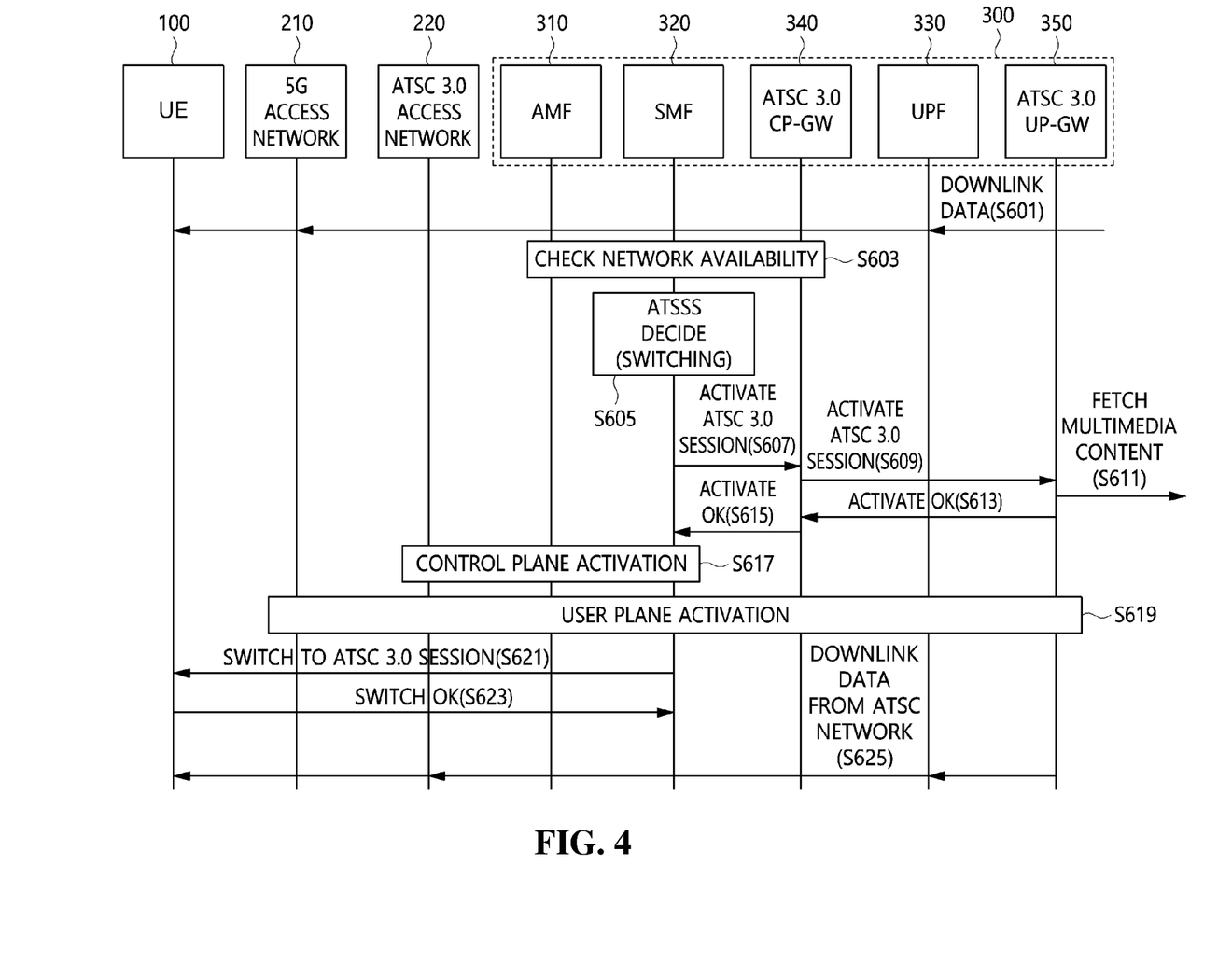
FIG. 4 is a signal flow diagram for explaining an ATSSS switching process according to an embodiment.

FIG. 4 is a signal flow diagram for explaining an ATSSS switching process according to an embodiment.

Referring to FIG. 4, it may be determined to switch from a 5G access network 210 to an ATSC 3.0 terrestrial network 220 at steps S601 to S605 depending on the number of accesses to the 5G access network 210 for multimedia content.

That is, while the UE 100 is receiving multimedia content over the 5G access network 210 at step S601, when the number of accesses to the 5G access network for the multimedia content becomes equal to or greater than a predetermined threshold, an SMF 320 checks whether the requested multimedia content is suitable for transmission over the ATSC 3.0 terrestrial network at step S603.

Depending on the result of network suitability checking at step S603, the SMF 320 determines whether to perform ATSSS switching at step S605.

When it is determined to perform ATSSS switching at step S605, the SMF 320 tells an ATSC 3.0 CP-GW 340 to start an ATSC 3.0 session with the multimedia content at step S607, and the ATSC 3.0 CP-GW 340 activates an ATSC 3.0 UP-GW 350 at step S609.

Accordingly, the activated ATSC 3.0 UP-GW 350 starts to fetch the requested multimedia content at step S611. Here, the ATSC 3.0 UP-GW 350 may transmit an activation response signal (Activate OK) to the SMF 320 via the ATSC 3.0 CP-GW 340 at steps S613 to S615.

Then, a control plane for transmitting and receiving control signals over the ATSC 3.0 terrestrial network 220 is activated at step S617. Also, a user plane for transmitting and receiving data over the ATSC 3.0 terrestrial network 220 is activated at step S619.

The SMF 320 transmits a switching request message for requesting access switching from the 5G access network 210 to the ATSC 3.0 terrestrial network 220 to the user equipment 100 at step S621. Here, the SMF 320 transmits an N1 message to the UE 100, thereby requesting the UE 100 to change a data transmission rule for performing ATSSS from the 5G access network 210 to the ATSC 3.0 terrestrial network 220.

Accordingly, after access switching from the 5G access network 210 to the ATSC 3.0 terrestrial network 220, the UE 100 transmits an access switch response message (SWITCH OK) to the SMF 320 at step S623.

Then, the multimedia content transmitted from the ATSC 3.0 UP-GW 350 to a user plane entity 330 may be delivered to the UE 100 over the ATSC 3.0 terrestrial network 220 at step S625.

Figure 5:
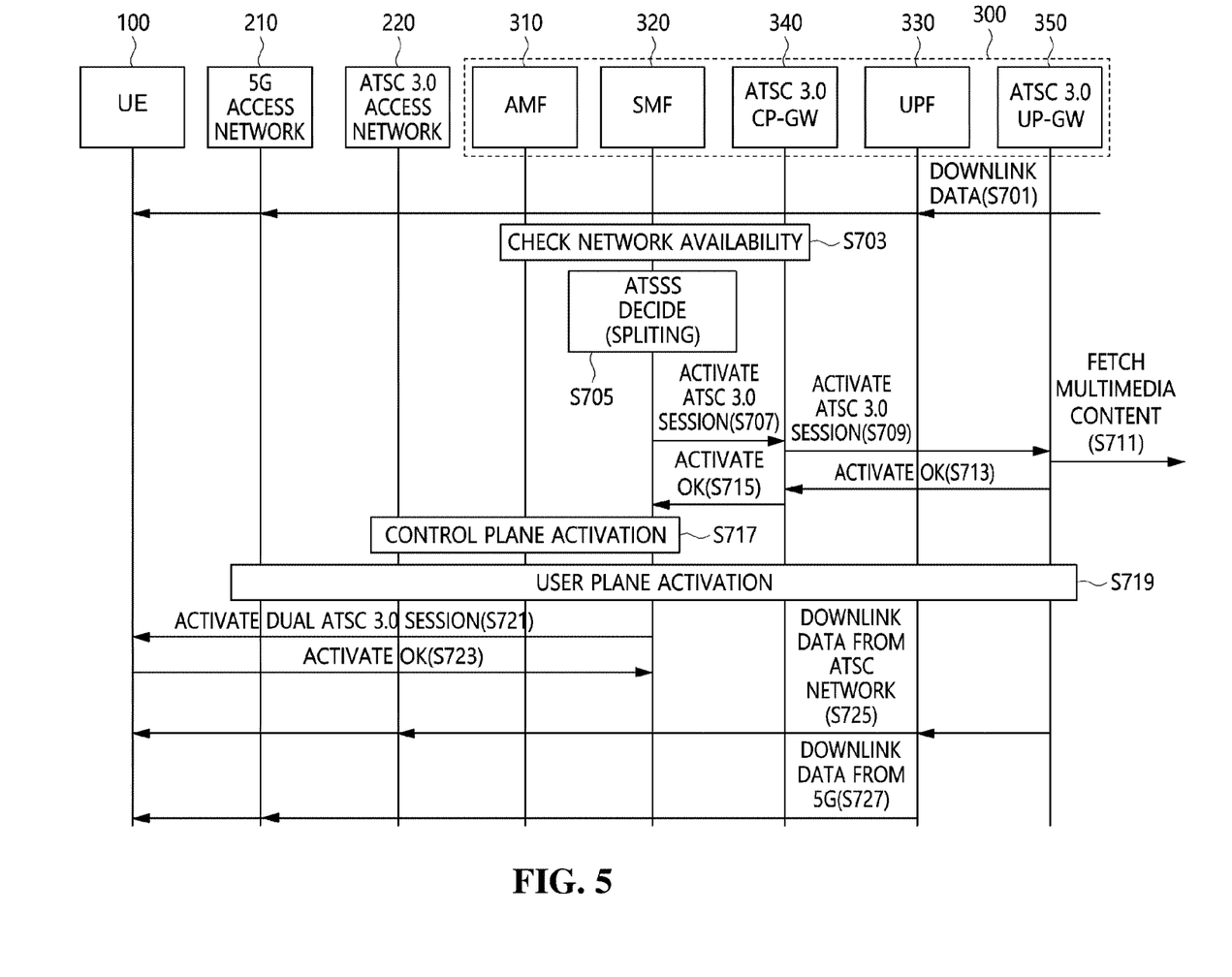
FIG. 5 is a signal flow diagram for explaining an ATSSS splitting process according to an embodiment.

FIG. 5 is a signal flow diagram for explaining an ATSSS splitting process according to an embodiment.

Referring to FIG. 5, depending on the number of accesses to a 5G access network 210 for multimedia content, it may be determined to split access between the 5G access network 210 and an ATSC 3.0 terrestrial network 220 at steps S701 to S705.

That is, while the UE 100 is receiving multimedia content over the 5G access network 210 at step S701, when the number of accesses to the 5G access network for the multimedia content becomes equal to or greater than a predetermined threshold, an SMF 320 checks whether the requested multimedia content is suitable for delivery over the ATSC 3.0 terrestrial network at step S703.

Depending on the result of network suitability checking at step S703, the SMF 320 determines to whether to perform ATSSS splitting at step S705.

When it is determined to perform ATSSS splitting at step S705, the SMF 320 tells an ATSC 3.0 CP-GW 340 to start an ATSC 3.0 session with the multimedia content at step S707, and the ATSC 3.0 CP-GW 340 activates an ATSC 3.0 UP-GW 350 at step S709.

Accordingly, the activated ATSC 3.0 UP-GW 350 starts to fetch the requested multimedia content at step S711. Here, the ATSC 3.0 UP-GW 350 may transmit an activation response signal (Activate OK) to the SMF 320 via the ATSC 3.0 CP-GW 340 at steps S713 to S715.

Then, a control plane for transmitting and receiving control signals over the ATSC 3.0 terrestrial network 220 is activated at step S717.

Also, a user plane for transmitting and receiving data over the ATSC 3.0 terrestrial network 220 is activated at step S719.

The SMF 320 transmits a dual access request message for requesting dual access to the 5G access network 210 and the ATSC 3.0 terrestrial network 220 to the UE 100 at step S721. Accordingly, after dual access to the 5G access network 210 and the ATSC 3.0 terrestrial network 220, the UE 100 transmits a dual access activation response message (ACTIVATE OK) to the SMF 320 at step S723.

Then, the multimedia content transmitted from the ATSC 3.0 UP-GW 350 to a user plane entity 330 may be delivered to the UE 100 over the 5G access network 210 and the ATSC 3.0 terrestrial network 220 at steps S725 to S727.

Meanwhile, in the case of trusted convergence, a single core network manages all of broadcast technology and broadband technology, as described above, and Layer-1 convergence, which is for a common signal for delivering both an ATSC 3.0 frame and a 5G frame, is incentivized.

Figure 6:
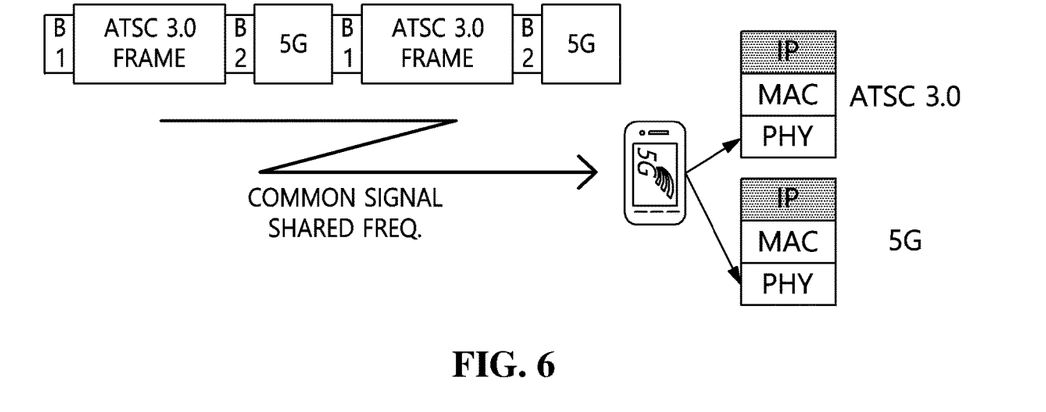
FIG. 6 is a view illustrating an example in which multimedia content is multiplexed in a time domain according to an embodiment.

FIG. 6 is an exemplary view in which multimedia content is multiplexed in the time domain according to an embodiment.

Referring to FIG. 6, when Time-Division Multiplexing (TDM) is selected, accurate synchronization is required for frame arrangement, and frames may be distributed and provided to both ATSC 3.0 infrastructure and 5G infrastructure by a 5G core network. Accordingly, when multiplexing in the time domain is selected, a main version bootstrap may be used to announce the start of an NR frame. Accordingly, ATSC 3.0 signals and the NR frames are arranged according to time, which facilitates a decoding process.

Meanwhile, each of the user equipment 100, the AMF 310, the SMF 320, the UPF 330, the ATSC 3.0 CP-GW 340, and the ATSC 3.0 UP-GW 350 of FIG. 2 may be implemented as a computer system, for example, a computer-readable recording medium. Also, because the AMF 310, the SMF 320, the UPF 330, the ATSC 3.0 CP-GW 340 and the ATSC 3.0 UP-GW 350 are logically separated functional blocks, they may be implemented in a single computer system.

Figure 7:
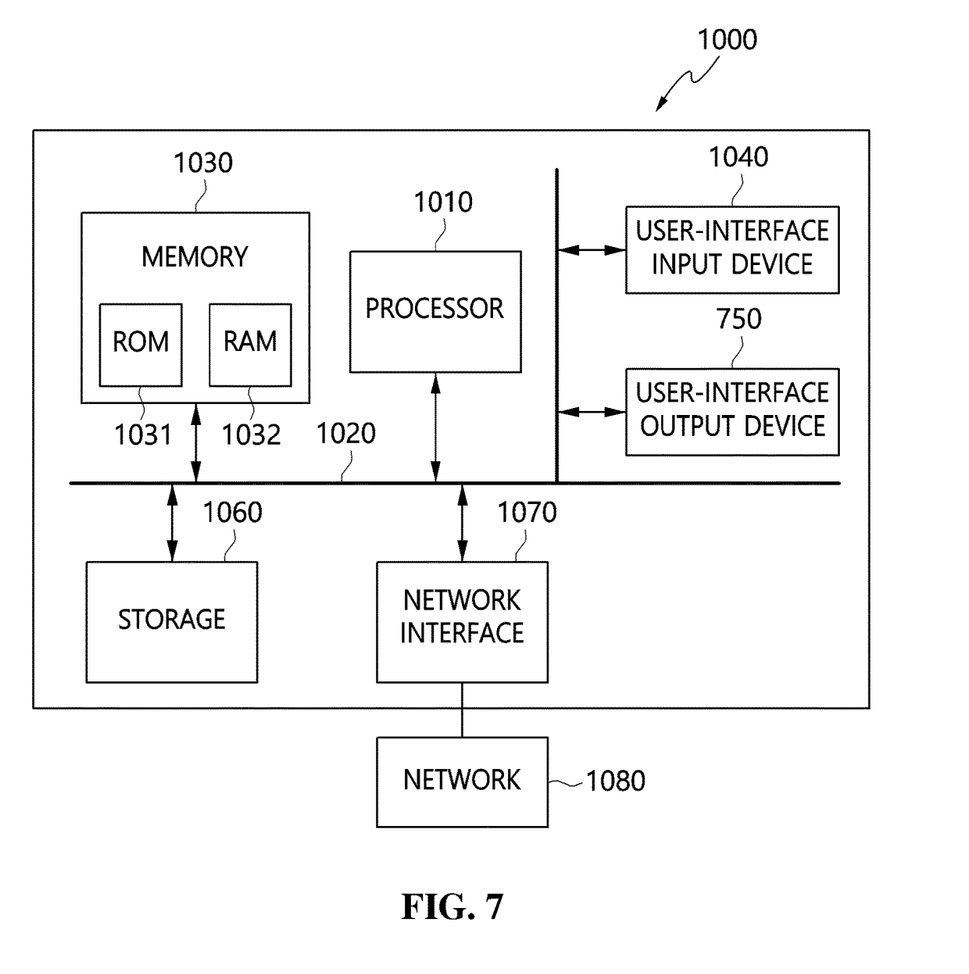
FIG. 7 is a view illustrating a computer system configuration according to an embodiment.

FIG. 7 is a view illustrating a computer system configuration according to an embodiment.

The apparatus according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

According to the disclosed embodiment, scalable and cost-efficient Point-to-Multipoint (P2M) transmission, through which high-quality multimedia content can be provided to a large number of users, may be realized in 5G.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for controlling transmission of multimedia content in a control plane entity, comprising:
   determining whether to perform Access Traffic Steering, Switching and Splitting (ATSSS) based on whether the multimedia content is suitable for transmission over an ATSC 3.0 terrestrial network;
   performing control so as to initialize an ATSC 3.0 session with an ATSC 3.0 Control Plane Gateway (CP-GW) and to activate an ATSC 3.0 User Plane Gateway (UP-GW) when it is determined to perform the ATSSS; and
   activating a control plane for transmitting and receiving control signals over the ATSC 3.0 terrestrial network and a user plane for transmitting and receiving data over the ATSC 3.0 terrestrial network,
   wherein the multimedia content transmitted from the ATSC 3.0 UP-GW to a user plane entity is delivered to user equipment over the ATSC 3.0 terrestrial network.

2. The method of claim 1, wherein determining whether to perform the ATSSS is configured to determine to perform steering from a 5G access network to the ATSC 3.0 terrestrial network in response to a request for the multimedia content from user equipment registered in the 5G access network.

3. The method of claim 1, wherein:
   determining whether to perform the ATSSS is configured to determine to switch from a 5G access network to the ATSC 3.0 terrestrial network based on a number of accesses to the 5G access network for the multimedia content,
   the method further comprises:
   transmitting a switching request message for requesting access switching from the 5G access network to the ATSC 3.0 terrestrial network to the user equipment after activating the control plane and the user plane, and
   the user plane entity transmits the multimedia content, transmitted from the ATSC 3.0 UP-GW, over the ATSC 3.0 terrestrial network.

4. The method of claim 1, wherein:
   determining whether to perform the ATSSS is configured to determine to split from a 5G access network to the ATSC 3.0 terrestrial network based on a number of accesses to the 5G access network for the multimedia content,
   the method further comprises:
   transmitting a dual access request message for requesting dual access to the 5G access network and the ATSC 3.0 terrestrial network to the user equipment after activating the control plane and the user plane, and
   the user plane entity transmits the multimedia content, transmitted from the ATSC 3.0 UP-GW, over the 5G access network and the ATSC 3.0 terrestrial network.

5. The method of claim 1, further comprising:
   sending, by the ATSC 3.0 UP-GW, an activation response to the ATSC 3.0 CP-GW, and
   sending, by the ATSC 3.0 CP-GW, an activation response to the control plane entity.

6. The method of claim 1, wherein the ATSC 3.0 CP-GW generates timing/management information (timing & management information) for managing a preamble of an ATSC 3.0 frame and a Single-Frequency Network (SFN).

7. The method of claim 1, wherein the ATSC 3.0 CP-GW communicates with the control plane entity through an N_ATSC_C interface and communicates with the user plane entity through an N_ATSC_U interface.

8. The method of claim 1, wherein the ATSC 3.0 UP-GW performs data forwarding and ALP/STL formatting.

9. A control plane entity, comprising:
   memory in which at least one program is recorded; and
   a processor for executing the program,
   wherein the program performs
   determining whether to perform Access Traffic Steering, Switching and Splitting (ATSSS) based on whether multimedia content is suitable for transmission over an ATSC 3.0 terrestrial network;
   performing control so as to initialize an ATSC 3.0 session with an ATSC 3.0 Control Plane Gateway (CP-GW) and to activate an ATSC 3.0 User Plane Gateway (UP-GW) when it is determined to perform the ATSSS; and
   activating a control plane for transmitting and receiving control signals over the ATSC 3.0 terrestrial network and a user plane for transmitting and receiving data over the ATSC 3.0 terrestrial network,
   wherein the multimedia content transmitted from the ATSC 3.0 UP-GW to a user plane entity is delivered to user equipment over the ATSC 3.0 terrestrial network.

10. The control plane entity of claim 9, wherein determining whether to perform the ATSSS is configured to determine to perform steering from a 5G access network to the ATSC 3.0 terrestrial network in response to a request for the multimedia content from user equipment registered in the 5G access network.

11. The control plane entity of claim 9, wherein:
    determining whether to perform the ATSSS is configured to determine to switch from a 5G access network to the ATSC 3.0 terrestrial network based on a number of accesses to the 5G access network for the multimedia content,
    the program further performs transmitting a switching request message for requesting access switching from the 5G access network to the ATSC 3.0 terrestrial network to the user equipment after activating the control plane and the user plane, and
    the user plane entity transmits the multimedia content, transmitted from the ATSC 3.0 UP-GW, over the ATSC 3.0 terrestrial network.

12. The control plane entity of claim 9, wherein:
    determining whether to perform the ATSSS is configured to determine to split from a 5G access network to the ATSC 3.0 terrestrial network based on a number of accesses to the 5G access network for the multimedia content,
    the program further performs transmitting a dual access request message for requesting dual access to the 5G access network and the ATSC 3.0 terrestrial network to the user equipment after activating the control plane and the user plane, and
    the user plane entity transmits the multimedia content, transmitted from the ATSC 3.0 UP-GW, over the 5G access network and the ATSC 3.0 terrestrial network.

13. The control plane entity of claim 9, wherein the ATSC 3.0 CP-GW generates timing/management information (timing & management information) for managing a preamble of an ATSC 3.0 frame and a Single-Frequency Network (SFN).

14. The control plane entity of claim 9, wherein the ATSC 3.0 CP-GW communicates with the control plane entity through an N_ATSC_C interface and communicates with the user plane entity through an N_ATSC_U interface.

15. The control plane entity of claim 9, wherein the ATSC 3.0 UP-GW performs data forwarding and ALP/STL formatting.

* * * * *